US011683863B2

(12) United States Patent
Chen

(10) Patent No.: US 11,683,863 B2
(45) Date of Patent: Jun. 20, 2023

(54) METHOD OF MAKING HEATING FILM FOR VEHICULAR LAMPSHADE AND FINISHED PRODUCT THEREOF

(71) Applicant: Shu-Lien Chen, Taichung (TW)

(72) Inventor: Shu-Lien Chen, Taichung (TW)

( * ) Notice: Subject to any disclaimer, the term of this patent is extended or adjusted under 35 U.S.C. 154(b) by 482 days.

(21) Appl. No.: 16/847,675

(22) Filed: Apr. 14, 2020

(65) Prior Publication Data

US 2021/0321492 A1   Oct. 14, 2021

(51) Int. Cl.
*B32B 3/00* (2006.01)
*H05B 3/34* (2006.01)
*B32B 7/12* (2006.01)
B32B 27/08 (2006.01)
H05B 3/04 (2006.01)

(52) U.S. Cl.
CPC ............. *H05B 3/34* (2013.01); *B32B 7/12* (2013.01); *B32B 27/08* (2013.01); *B32B 2307/202* (2013.01); *B32B 2457/00* (2013.01); *H05B 3/04* (2013.01); *H05B 2203/013* (2013.01); *H05B 2203/017* (2013.01)

(58) Field of Classification Search
CPC ............................ B32B 7/12; B32B 2307/202
See application file for complete search history.

(56) References Cited

U.S. PATENT DOCUMENTS

2005/0252390 A1* 11/2005 Chen ............... H05B 3/84
101/17
2020/0056756 A1* 2/2020 Kim ................ F21S 41/336
2021/0317979 A1* 10/2021 Chen ................ F21V 29/90

FOREIGN PATENT DOCUMENTS

CN   105592578        5/2016
CN   110036690 A  *  7/2019  ............ B32B 27/06
TW   201704015        2/2017

* cited by examiner

*Primary Examiner* — Elizabeth E Mulvaney

(57) ABSTRACT

A method of making a heating film for a vehicular lampshade contains steps of: producing an adhesive layer in which a substrate made of transparent resin is provided, transparent adhesive is coated on the substrate to form a first adhesive portion, and the transparent adhesive is coated on the substrate opposite to the first surface to form a second adhesive portion; adhering a release paper on the first adhesive portion; and forming a conductive layer on the second adhesive portion. A cover lamination is printed on the conductive layer and is curved, such that a portion of the conductive layer not being covered by the cover lamination is removed in an etching manner so as to maintain the other portion of the conductive layer covered by the cover lamination and to form a curved current path. The conductive layer includes two electrical contacts electrically connected with two wires respectively.

8 Claims, 2 Drawing Sheets

METHOD OF MAKING HEATING FILM FOR VEHICULAR LAMPSHADE AND FINISHED PRODUCT THEREOF

FIELD OF THE INVENTION

The present invention relates to a spare part of a vehicular lampshade, and more particularly to a method of making a heating film for a vehicular lampshade and a finished product thereof which are applied to eliminate waters or snows from the vehicular lampshade.

BACKGROUND OF THE INVENTION

A conventional headlight emits lights via a vehicular lampshade, so moistures condenses inside the vehicular lampshade after ambient temperature reduces greatly, thus influencing an emitting angle and path of the lights from the headlight.

The present invention has arisen to mitigate and/or obviate the afore-described disadvantages.

SUMMARY OF THE INVENTION

The primary objective of the present invention is to a method of making a heating film for a vehicular lampshade and a finished product thereof which contains a conductive layer through which electric currents flow to provide heat, thus eliminating the waters or snows on the vehicular lampshade effectively.

To obtain above-mentioned objective, a method of making a heating film for a vehicular lampshade provided by the present invention contains steps of:

producing an adhesive layer, wherein a substrate made of transparent resin is provided, transparent adhesive is coated on a first surface of the substrate to form a first adhesive portion, and the transparent adhesive is coated on a second surface of the substrate opposite to the first surface to form a second adhesive portion;

adhering a release paper, wherein the releases paper is adhered on the first adhesive portion; and forming a conductive layer, wherein the conductive layer is formed on the second adhesive portion, and a cover lamination is printed on the conductive layer, wherein the cover lamination is curved so as to cover the conductive layer partially, and a portion of the conductive layer not being covered by the cover lamination is removed in an etching manner so as to maintain the other portion of the conductive layer covered by the cover lamination and to form a curved current path, wherein the conductive layer includes two electrical contacts, and a respective one of the two electrical contacts is formed on each of two ends of the conductive layer and is electrically connected with a respective one of two wires, wherein the cover lamination is eliminated by ways of a solvent after removing the portion of the conductive layer.

Preferably, the method further contains a step of forming a protective layer on the conductive layer after the step of forming the conductive layer.

In addition, a heating film for the vehicular lampshade contains: the substrate, the release paper, and the conductive layer.

The substrate includes a first adhesive portion formed on a first surface thereof, and the substrate includes a second adhesive portion formed on a second surface thereof opposite to the first surface, wherein the first adhesive portion and the second adhesive portion are made of optical adhesive.

The release paper is adhered on the first adhesive portion. The conductive layer is adhered with the second adhesive portion and is curved so as to form a curved current path.

DETAILED DESCRIPTION OF THE PREFERRED EMBODIMENTS

Figure 1:
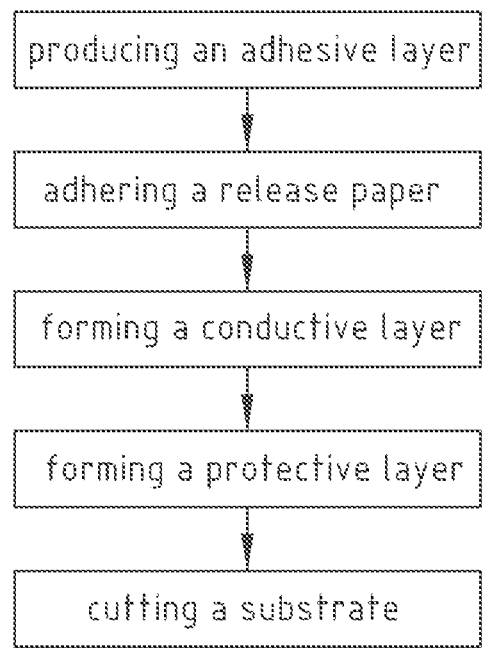
FIG. 1 is a flow chart of a method of making a heating film for a vehicular lampshade according to a preferred embodiment of the present invention.
Figure 2:
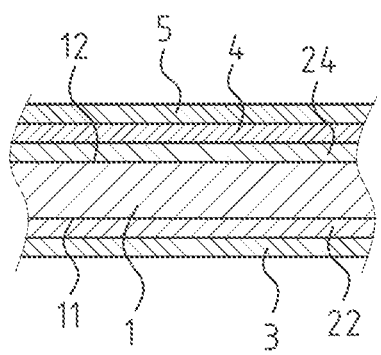
FIG. 2 is a cross section view showing the assembly of the heating film made by the method of the preferred embodiment of the present invention.
Figure 3:
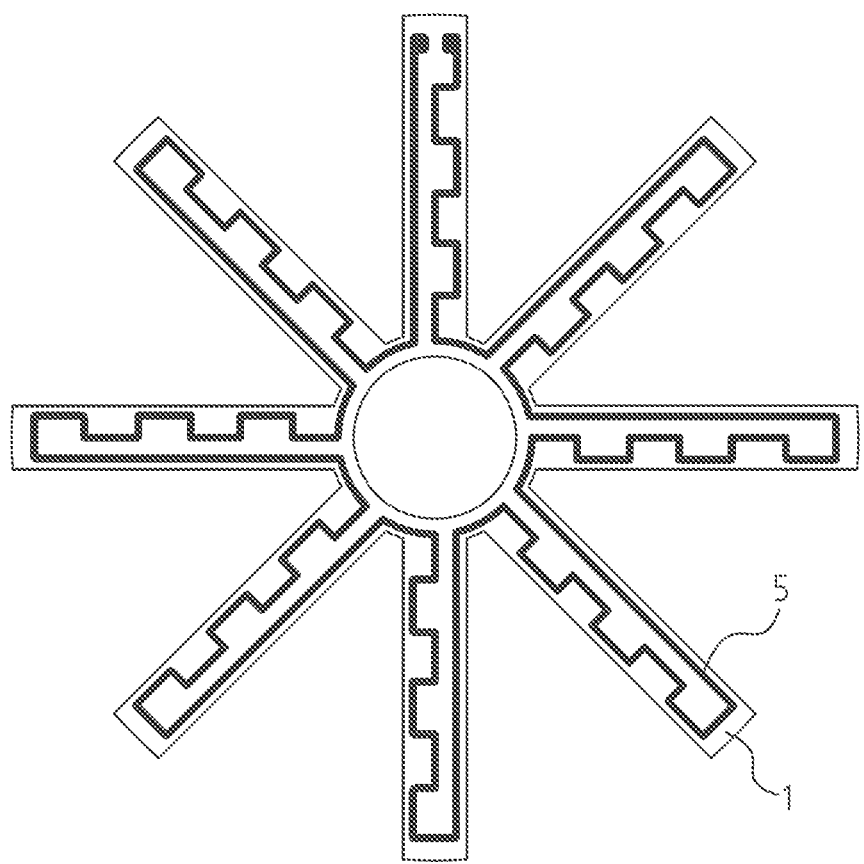
FIG. 3 is a top plan view showing the assembly of the assembly of the heating film made by the method of the preferred embodiment of the present invention.

With reference to FIGS. 1-3, a method of making a heating film for a vehicular lampshade according to a preferred embodiment of the present invention comprises steps of:

producing an adhesive layer, wherein a substrate 1 made of transparent resin is provided, transparent adhesive is coated on a first surface 11 of the substrate 1 to form a first adhesive portion 22, and the transparent adhesive is coated on a second surface 12 of the substrate 1 opposite to the first surface 11 to form a second adhesive portion 24, wherein the transparent adhesive is optical adhesive;

adhering a release paper, wherein the releases paper 3 is adhered on the first adhesive portion 22;

forming a conductive layer, wherein the conductive layer 4 is formed on the second adhesive portion 24 and is connected with the substrate 1 via the second adhesive portion 24, and a cover lamination (not shown) is printed on the conductive layer 4, wherein the cover lamination is curved so as to cover the conductive layer 4 partially, and a portion of the conductive layer 4 not being covered by the cover lamination is removed in an etching manner so as to maintain the other portion of the conductive layer 4 covered by the cover lamination and to form a curved current path, wherein the conductive layer 4 is conductive electrically and 4 includes two electrical contacts (not shown), and a respective one of the two electrical contacts is formed on each of two ends of the conductive layer 4 and is electrically connected with a respective one of two wires, such that an external power transmits to and heats the conductive layer 4, wherein the cover lamination is eliminated by ways of a solvent after removing the portion of the conductive layer 4;

forming a protective layer, wherein a waterproof material is coated on the conductive layer 4 so as to form the protective layer 5 to avoid a short circuit.

In the step of forming the protective layer, the waterproof paint is coated on the conductive layer 4 in a printing manner. Alternatively, the protective layer 5 is made of a transparent waterproof material and is adhered on the conductive layer 4. However, the step of forming the protective layer is alternatively embodied to the method of the present invention.

The method of the present invention further comprises a step of:

cutting the substrate, wherein the substrate 1 is cut in a desired shape, such as a lampshade shape.

Referring to FIG. 2, the heating film of the present invention comprises: the substrate 1, the release paper 3, and the conductive layer 4.

The substrate 1 includes the first adhesive portion 22 formed on the first surface 11 thereof, and the substrate 11 includes the second adhesive portion 24 formed on the second surface 12 thereof opposite to the first surface 11, wherein the transparent adhesive of the first adhesive portion 22 and the second adhesive portion 24 is the optical adhesive, the release paper 3 is adhered on the first adhesive portion 22, the conductive layer 4 is adhered with the second adhesive portion 24, and the cover lamination is curved so as to cover the conductive layer 4 partially, wherein the protective layer 5 is made of the transparent waterproof material and is adhered on the conductive layer 4.

In operation, the release paper 3 is removed from the first adhesive portion 22 so as to adhere the first adhesive portion 22 of the substrate 1 on the vehicular lampshade proximate to a headlight (not shown), the respective one electrical contact of each end of the conductive layer 4 is electrically connected with the respective one wire, and the respective one wire is coupled with the external power, thus connecting the heating film on the vehicular lampshade.

FIG. 3 is a plan view showing the assembly of the heating film of the vehicular lampshade according to another preferred embodiment. Preferably, the heating film is formed in various shapes based on using requirements.

Thereby, the conductive layer 4 is heated after electrical currents flow therethrough to avoid waters condensing on the vehicular lampshade, thus eliminating the waters or snows on the vehicular lampshade effectively.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method of making a heating film for a car lampshade comprising steps of:
    producing an adhesive layer, wherein a substrate made of transparent resin is provided, transparent adhesive is coated on a first surface of the substrate to form a first adhesive portion, and the transparent adhesive is coated on a second surface of the substrate opposite to the first surface to form a second adhesive portion;
    adhering a release paper, wherein the releases paper is adhered on the first adhesive portion; and
    forming a conductive layer, wherein the conductive layer is formed on the second adhesive portion, and a cover lamination is printed on the conductive layer, wherein the cover lamination is curved so as to cover the conductive layer partially, and a portion of the conductive layer not being covered by the cover lamination is removed in an etching manner so as to maintain the other portion of the conductive layer covered by the cover lamination and to form a curved current path, wherein the conductive layer includes two electrical contacts, and a respective one of the two electrical contacts is formed on each of two ends of the conductive layer and is electrically connected with a respective one of two wires, wherein the cover lamination is eliminated by ways of a solvent after removing the portion of the conductive layer;
    wherein the method further comprises a step of forming a protective layer on the conductive layer after the step of forming the conductive layer.

2. The method as claimed in claim 1, wherein a waterproof paint is coated on the conductive layer to form the protective layer.

3. The method as claimed in claim 1, wherein the protective layer is adhered on the conductive layer.

4. The method as claimed in claim 3, wherein the protective layer is made of a transparent waterproof material.

5. A heating film for the car lampshade of claim 1 comprising: a substrate, a release paper, and a conductive layer;
    wherein the substrate includes a first adhesive portion formed on a first surface thereof, and the substrate includes a second adhesive portion formed on a second surface thereof opposite to the first surface, wherein the first adhesive portion and the second adhesive portion are made of optical adhesive;
    wherein the release paper is adhered on the first adhesive portion; and
    wherein the conductive layer is adhered with the second adhesive portion and is curved so as to form a curved current path.

6. A heating film for the car lampshade of claim 2 comprising: a substrate, a release paper, and a conductive layer;
    wherein the substrate includes a first adhesive portion formed on a first surface thereof, and the substrate includes a second adhesive portion formed on a second surface thereof opposite to the first surface, wherein the first adhesive portion and the second adhesive portion are made of optical adhesive;
    wherein the release paper is adhered on the first adhesive portion; and
    wherein the conductive layer is adhered with the second adhesive portion and is curved so as to form a curved current path.

7. A heating film for the car lampshade of claim 3 comprising: a substrate, a release paper, and a conductive layer;
    wherein the substrate includes a first adhesive portion formed on a first surface thereof, and the substrate includes a second adhesive portion formed on a second surface thereof opposite to the first surface, wherein the first adhesive portion and the second adhesive portion are made of optical adhesive;
    wherein the release paper is adhered on the first adhesive portion; and
    wherein the conductive layer is adhered with the second adhesive portion and is curved so as to form a curved current path.

8. A heating film for the car lampshade of claim 4 comprising: a substrate, a release paper, and a conductive layer;
    wherein the substrate includes a first adhesive portion formed on a first surface thereof, and the substrate includes a second adhesive portion formed on a second surface thereof opposite to the first surface, wherein the first adhesive portion and the second adhesive portion are made of optical adhesive;
    wherein the release paper is adhered on the first adhesive portion; and
    wherein the conductive layer is adhered with the second adhesive portion and is curved so as to form a curved current path.

* * * * *